US008762983B2

(12) United States Patent
You

(10) Patent No.: US 8,762,983 B2
(45) Date of Patent: Jun. 24, 2014

(54) HOT DEPLOYMENT OF SOFTWARE

(75) Inventor: Zhantao You, Hangzhou (CN)

(73) Assignee: Alibaba Group Holding Limited (KY)

( * ) Notice: Subject to any disclaimer, the term of this patent is extended or adjusted under 35 U.S.C. 154(b) by 314 days.

(21) Appl. No.: 12/932,065

(22) Filed: Feb. 17, 2011

(65) Prior Publication Data

US 2011/0214113 A1 Sep. 1, 2011

(30) Foreign Application Priority Data

Feb. 26, 2010 (CN) .......................... 2010 1 0114369

(51) Int. Cl.
 G06F 9/44 (2006.01)
 G06F 9/445 (2006.01)
 G06F 15/177 (2006.01)

(52) U.S. Cl.
 USPC .......................... 717/172; 717/176; 709/221

(58) Field of Classification Search
 USPC ........................................................ 717/172
 See application file for complete search history.

(56) References Cited

U.S. PATENT DOCUMENTS

| 7,051,316 | B2 | 5/2006 | Charisius et al. | |
|---|---|---|---|---|
| 7,721,277 | B1 | 5/2010 | Thyagarajan et al. | |
| 2003/0105988 | A1* | 6/2003 | Shanbhogue | 714/7 |
| 2003/0225875 | A1* | 12/2003 | Revanuru et al. | 709/223 |
| 2007/0130341 | A1* | 6/2007 | Ma | 709/226 |
| 2007/0162565 | A1* | 7/2007 | Hanselmann | 709/219 |
| 2008/0162674 | A1 | 7/2008 | Dahiya | |
| 2008/0215714 | A1* | 9/2008 | Shimmura et al. | 709/221 |
| 2008/0271008 | A1* | 10/2008 | Dettori et al. | 717/168 |
| 2008/0288547 | A1 | 11/2008 | Brodsky et al. | |
| 2009/0106350 | A1 | 4/2009 | Chen et al. | |
| 2010/0030905 | A1 | 2/2010 | Fikouras et al. | |
| 2010/0281458 | A1 | 11/2010 | Paladino et al. | |

FOREIGN PATENT DOCUMENTS

CN 101192937 6/2008

OTHER PUBLICATIONS

Brewer, Eric A., "Lessons from Giant-Scale Services," IEEE, 2001, 10pg.*
Di Muro, E. A., "A Software Architecture for Translucent Replication," ACM, 2005, 5pg.*
Leangsuksun et. al., "Achieving high availability and performance computing with an HA-OSCAR cluster," Elsevier B.V., 2004, 10 pg.*

* cited by examiner

Primary Examiner — Ryan Coyer
(74) Attorney, Agent, or Firm — Van Pelt, Yi & James LLP

(57) ABSTRACT

Hot deployment of software includes: configuring a first service processing engine and a second service processing engine, wherein each of the first and the second service processing engine is configured to perform a service; setting the first service processing engine into an operation status and the second service processing engine into a wait status; detecting a change that is to affect performance of the service; and updating the second service processing engine in the wait status based at least in part on the detected change.

17 Claims, 7 Drawing Sheets

HOT DEPLOYMENT OF SOFTWARE

CROSS REFERENCE TO OTHER APPLICATIONS

This application claims priority to People's Republic of China Patent Application No. 201010114369.7 entitled METHOD AND SYSTEM FOR HOT DEPLOYMENT OF SOFTWARE SYSTEM filed Feb. 26, 2010 which is incorporated herein by reference for all purposes.

FIELD OF THE INVENTION

The present application relates to software deployment and in particular to hot deployment of software.

BACKGROUND OF THE INVENTION

System availability is crucial for mission critical systems such as finance systems, electronic commerce systems, etc. Mission critical systems typically require uninterrupted 24-hour service. Financial loss may result if the system is not available. Unfortunately, such systems often have complex and varying service rules and need to be upgraded frequently. After the service rule is changed, the system may need to be restarted for upgrading, which can interrupt the availability of the system.

Techniques of hot deployment of software have been created in order to avoid any loss due to the restarting of the system for upgrading. "Hot deployment" refers to the upgrading of software during the operation of a software without restarting the system running the software. Chinese Patent Application No. 200610123883.0 suggests an existing hot deployment method in which a server to be upgraded is backed up while providing a service to the outside and is then switched to the upgraded web server at the end of upgrading so as to appear as a method of hot deployment to the outside (e.g., clients making requests of the server). At least two servers are required for hot deployment in such a hot deployment method.

The foregoing patent applicant document additionally discusses the following hot deployment method:

In a Browser/Server (B/S) architecture-based platform typically adopted for an existing system, a Java-based Web server is typically adopted in an architecture model of MVC (Model, View, and Control), which is divided into several layers of view, control, and model. In particular:

The view layer refers to a user interaction interface, i.e., a Web interface, and typically is a static text file or a Java Server Page (JSP). According to the JavaEE specification, a Web application can be put into effect without being restarted upon modification at the view layer.

The control layer is configured to receive a request from a user and to match the model layer and the view layer to jointly resolve the request of the user. Since this part is independent of any service logic and involves only forwarding the request from the view layer to the corresponding model layer, the control layer will be changed only by a forwarding configuration instead of a forwarding rule. If the forwarding configuration is changed, then it will be sufficient to reload just a new or modified configuration file without restarting the entire system.

The model layer is configured to process a service flow/status and a service rule and refers to a service logic module. At the traditional Web server, the model layer is loaded into a class loader of the same Web application. A loaded class to be updated has to be reloaded into the class loader of the Web application. As a consequence, the module has to be added/updated/deleted, which necessitates a restarting of the Web application. The solution disclosed in Application No. 200610123883.0 suggests for use of the traditional Web server based upon the MVC, so that an open service gateway architecture is arranged in the server in the B/S architecture, and the model layer of the server in the B/S architecture is arranged in respective sub-modules of the open service gateway architecture. Since the respective sub-modules of the open service gateway architecture are provided with their own class loaders, when a certain sub-module is changed, it will be sufficient to restart only the class loader specific to the sub-module and thereby avoid restarting of the class loader of the entire Web application (i.e., hot deployment of the class loader with the Web application is performed).

A number of issues remain in the existing hot deployment methods. In the first method for hot deployment involving backing up the entire server as another server, an additional server will be required. However, adding an additional server could be costly. In the second method for hot deployment involving the introduction of the open service gateway architecture, the model layer has to be arranged in the respective sub-modules of the open service gateway architecture, and when the model layer is changed, the respective sub-modules of the open service gateway architecture still have to be restarted despite the possibility of hot deployment of the class loader of the Web application. As a consequence, this method does not result in full hot deployment. Moreover, in order to apply this method of hot employment, the existing system has to be modified considerably, which could yield problems of low stability and poor security.

BRIEF DESCRIPTION OF THE DRAWINGS

Various embodiments of the invention are disclosed in the following detailed description and the accompanying drawings.

DETAILED DESCRIPTION

Figure 1:
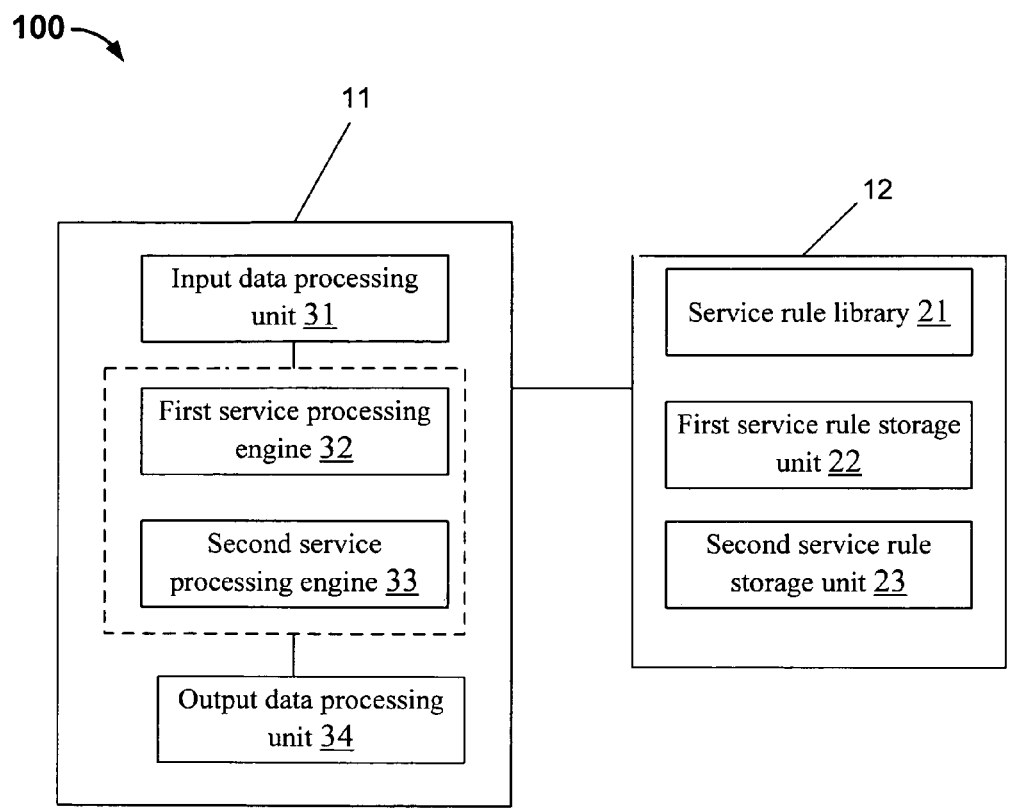
FIG. 1 is a diagram showing an embodiment of a system for hot deployment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Hot deployment using at least two service processing engines that are alternately operative in the same system is disclosed. In some embodiments, two service processing engines are used alternately so that when one of the service processing engines is in the operation status, the other is in the wait status. The two service processing engines are configured to perform the same services and functions and so may be interchangeably used to perform the same requested services. Only the service processing engine in the operation status can accept and process a service request of a client user, while other service processing engine that is in the wait status may be updating its corresponding service rule storage unit and/or processing settings (e.g., in response to a detected change that is made to a service rule or processing settings). When a service rule of the system is changed (e.g., at either of a first or second service rule storage unit and/or at a service rule library for the system) and an updating of the system is appropriate, the service processing engine in the wait status is updated with the newly added or modified service rule or processing setting. The newly updated service processing engine then switches from the wait status to the operation status and takes over a service that was processed by the service processing engine that was previously in the operation status (e.g., by accepting and processing the service request of the client user). Also, the service processing engine that was previously in the operation status becomes disabled and is put into the wait status to wait for the next update to the software and/or system on which the software runs. In various embodiments, the service processing engine in the wait status is restarted after being updated with the new service rule.

In some embodiments, at least two service processing engines are implemented on each server. So, all the servers (e.g., belonging to a single system) on which software is run may be updated at once during an upgrading of the system without restarting the system. Meanwhile the system is still capable of providing a service during the updating process. In various embodiments, hot deployment can also be performed on a single server to achieve dynamic updating and also improve the availability of the system. In various embodiments, hot deployment as disclosed may be accomplished without requiring any backing up of a server that is to be updated.

FIG. 1 is a diagram showing an embodiment of a system for hot deployment. System 100 includes server 11 and database 12 that are connected. In some embodiments, server 11 and database 12 communicate to one another via a network (not shown). The network may include high speed data networks and/or telecommunications networks. The processing engines, units and modules as mentioned herein can be implemented as software components executing on one or more processors, as hardware such as programmable logic devices and/or Application Specific Integrated Circuits designed to perform certain functions or a combination thereof. In some embodiments, the processing engines, units and modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The processing engines, units and modules may be implemented on a single device or distributed across multiple devices.

Database 12 includes service rule library 21 that is configured to store service rules. As used herein, a service rule refers to a condition that data may satisfy, and upon the satisfaction of the condition certain event occurs. For example, when a certain number of purchases of a product are made, a log entry is created. There may be one or more pieces of data and also a plurality of conditions that should be satisfied by the one or more pieces of data. Service rule library 21 may be updated frequently. In some embodiments, server rule library 21 may be updated by an operator (e.g., a user) who wishes to add or modify a service rule in service rule library 21.

As shown in the example, first service rule storage unit 22 is connected with service rule library 21 and configured to store one or more service rules. Second service rule storage unit 23 is connected with service rule library 21 and configured to store one or more service rules. In various embodiments, first service rule storage unit 22 and second service rule storage unit 23 store one or more of the same service rules.

All the service rules that are stored in first service rule storage unit 22 and second storage rule unit 23 are also stored in service rule library 21. To modify one of the service rules, an operator may modify the contents stored in service rule library 21. In various embodiments, first service rule storage unit 22 corresponds to a first service processing engine 32, and second service rule storage unit 23 corresponds to a second service processing engine 33.

Server 11 includes input data processing unit 31, which is configured to receive a service processing request (e.g., from a client user making a request to server 11). Input data processing unit 31 receives service processing request transmitted via various interfaces and processes them into data packets of a predetermined format. Input data processing unit 21 then transmits the data packet to whichever one of first service processing engine 32 and second service processing engine 33 that is currently operating. That is, input data processing unit 31 performs a preprocessing operation that includes receiving and parsing a service processing request to derive corresponding data (e.g., by formatting the processed requests into data packets). For example, service processing requests are transmitted via two interfaces. Upon reception of the service processing requests from either interface, input data processing unit 31 determines which of the two interfaces the service processing request is transmitted, parses the service processing request to derive the corresponding contents and transmits those contents to the service processing engine that is currently in the operation status for determining whether the received contents satisfy a service rule.

When set to the operation status, first service processing engine 32 is configured to determine whether a received service processing request satisfies the rule that is stored in corresponding first service rule storage unit 22. When set to the wait status, first service processing engine 32 is configured to detect a change to the processing setting of software running on the system, update the corresponding setting, and then set its status into the operation status. In various embodiments, a change to the processing setting of the software includes, among other things, a change to one of the service rules and/or a change to the processing setting of one of the processing engines.

In various embodiments, first service processing engine 32 processes a specific service logic and can also generate a service processing result in response to an input to server 11. First service processing engine 32, while in the operation status, can also sum up determination results or perform other operations on the results. First service processing engine 32 processes a specific service logic and generates a service processing result in response to an input. In some embodiments, first service processing engine 32 operates at least by determining whether the received service processing request satisfies the rule stored in corresponding first service rule storage unit 22 to result in a determination result, performing a process in a preset flow in response to the determination result and returning a service processing result. That is, first service processing engine 32 presets various operation flows and performs a process in response to a specific service processing request and performs an operation in the corresponding operation flow.

Second service processing engine 33 is configured to determine, when it's in the operation status, whether the received service processing request satisfies the second rule stored in second service rule storage unit 23. Second service processing engine 33 is also configured to detect, while it's in the wait status, a change to the processing setting of the software running on the system and accordingly update the corresponding setting and then set its status into the operation status. That is, while it's in the wait status, second service processing engine 33 detects whether the service rule and/or the processing setting of software running on the system has changed, and if so, it updates second service rule storage unit 23 and/or updates its own processing settings and then sets itself into the operation status.

First service processing engine 32 and second service processing engine 33 at least perform the process of determining whether the received service processing request satisfies the respectively stored services rules. In various embodiments, the results reached by first service processing engine 32 and second service processing engine 33 are similar, if not exactly the same, such that the two engines may be used (e.g., in the operation status) interchangeably.

Output data processing unit 34 is configured to output the service processing result. In some embodiments, one of the service processing engines (e.g., either first service processing engine 32 or second service processing engine 33) in the operation status processes the service processing request and then transmits the result to output data processing unit 34, so that output data processing unit 34 can convert the processed result into a preset format and then return it to a corresponding requester or result destination.

Service rule library 21 acts as a reference service rule library that can be modified to adjust the stored service rules. In some embodiments, if service rule library 21 is configured, then first service rule storage unit 21 and second service rule storage unit 22 store the same contents as those in the service rule library. Otherwise, if no service rule library is configured, then each of the first and second service rule storage units initially stores all the service rules. In some embodiments, periodically or in response to a condition/event, first service rule storage unit 22 and second service rule storage unit 23 are compared with the service rule library 21 to determine whether one of the rules has been added or changed. In some embodiments, when a modification is detected at service rule library 21, first service rule storage unit 22 and second service rule storage unit 23 are updated accordingly.

In some embodiments, stored service rules may be modified at either or both of the first service rule storage unit 22 and the second service rule storage unit 23. For example, first service rule storage unit 22 corresponding to first service processing engine 32 in the wait status can be directly modified to change any of the rules.

In some embodiments, first service rule storage unit 22 and/or the second service rule storage unit 23 can be integrated in the corresponding first service processing engine 32 and/or second service processing engine 33 instead of being arranged separately (e.g., in database 12).

In some embodiments, first service processing engine 32 and second service processing engine 33 correspond respectively to first service rule storage unit 22 and a second service rule storage unit 23, both of which are configured to store rules. The first service processing engine 32 processes a specific service logic in response to an input, including determining whether a received service processing request satisfies a service rule stored in first service rule storage unit 22. First service processing unit 32 also generates a service processing result in response to the input. In some embodiments, first service processing engine 32 is logically connected to first service rule storage unit 22, or the first service rule storage unit 22 is implemented directly in first service processing engine 32 (e.g., as a component of the processing engine). Second service processing unit 33 corresponds to second service rule storage unit 23 in a similar manner.

Moreover, whichever one of the second service processing engine 33 and first service processing engine 32 is in the operation status and the other is in the wait status may be implemented by various appropriate hardware or logic. For example, a status control unit (not shown) is arranged on each of first service processing engine 32 and second service processing engine 33, such that a first status control unit is arranged on first service processing engine 32 and a second status control unit is arranged on second service processing engine 33. As a consequence, the two service processing engines are controlled through communication between the first status control unit and the second status control unit so as to coordinate which one of the service processing engines is in the operation status so that the other is in the wait status.

Figure 2:
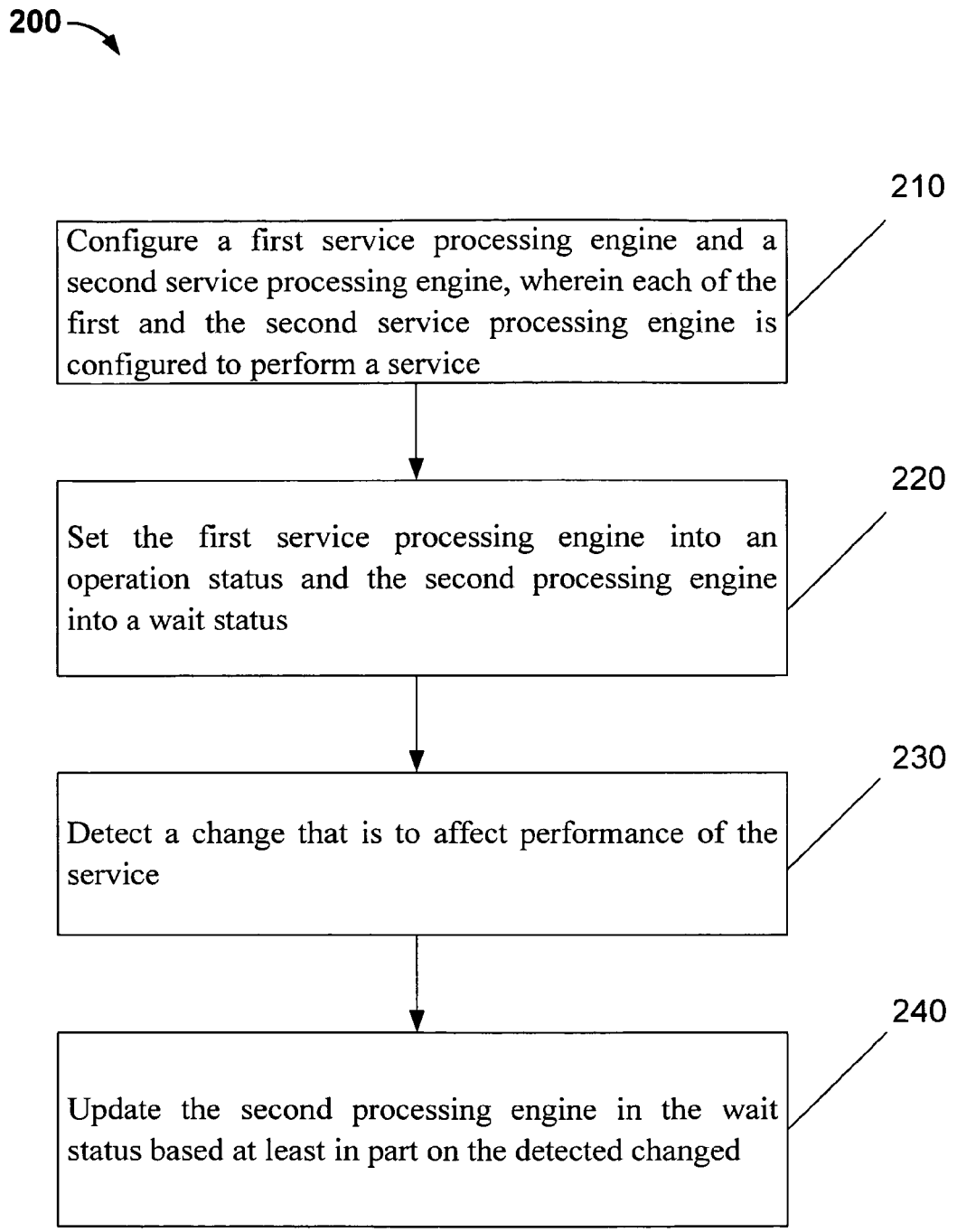
FIG. 2 is a flow diagram showing an embodiment of a process for hot deployment.

FIG. 2 is a flow diagram showing an embodiment of a process for hot deployment. In some embodiments, process 200 may be implemented by system 100.

At 210, a first service processing engine and a second service processing engine are configured, wherein each of the first and the second service processing engine is configured to perform a service. In various embodiments, each of the first and the second service processing engine is configured to perform a similar and/or interchangeable service/function as the other service processing engine.

In various embodiments, the first service processing engine is also configured to correspond to a first service rule storage unit and the second service processing is also configured to correspond to a second service rule unit. In some embodiments, the first service rule storage unit and the second service rule storage unit are each configured to store service rules. The first service processing engine processes a specific service logic in response to an input, which includes determining whether a received service processing request (e.g., received at the server on which the two service processing engines are run) satisfies the rule stored in the first service rule storage unit. Based on the determination of whether the received request satisfies the rule stored in the first rule storage unit, the first service processing engine generates a determination result. In some embodiments, the first service processing engine is connected with the first service rule storage unit via logic. In some embodiments, the first service rule storage unit is configured directly in the first service processing engine (e.g., the first service rule storage unit is configured as a component of the first service processing engine). The second service processing engine may be configured to correspond to and be connected with the second service rule storage unit in similar ways.

At 220, the first service processing engine is set into an operation status and the second processing engine is set into a wait status. In various embodiments, each of the first and second service processing engine includes an indicator (e.g., a data structure storing a value) that denotes whether the corresponding service processing engine is in the operation or in the wait status (e.g., when the value is zero, the engine is in the waiting status; when the value is one, the engine is in the waiting status).

At 230, a change that is to affect the performance of the service is detected. In various embodiments, the change (e.g., a modification or addition) made to the software includes a change to a service rule or a change to a processing setting. The change to a service rule or a change to a processing setting would entail, absent hot deployment, a restart of the software application running on the service or a restart of the entire system running the software application. Hot deployment, however, alleviates the need for restarting the application/entire system. In some embodiments, the change is detected by a component (e.g., a scan processing unit) of either of the first and second service processing engines whose primary function is to detect such changes. The change may be detected in the service rule library, the first service rule storage unit or the second service rule storage unit, for example.

At 240: the second processing engine in the wait status is updated based at least in part on the detected change. In some embodiments, the second service processing engine is updated by updating the service rule stored in the second service rule storage unit to correspond to a changed rule stored at the first service rule storage unit or the service rule library. In some embodiments, the second service processing engine is updated by updating its processing setting to correspond to a changed corresponding processing setting.

In various embodiments, after the second service processing engine is updated, it is set into the operation status while the first service processing engine is set into the wait status. In some embodiments, an operating service processing engine is notified to be set into the wait status based at least in part an disabling instruction that it receives from the waiting service processing engine. When the first service processing engine is in the wait status, it may be updated in ways similar to the updating of second service processing engine (e.g., based at least in part on the detected change). In some embodiments, the first service processing engine will remain in the wait status, even after the updating is completed, until another change is detected. At that point the waiting service processing engine (e.g., the first service processing engine) will be updated and switched into the operation status, and the previously operating service processing engine (e.g., the second service processing engine) will be set into the wait status.

Figure 3:
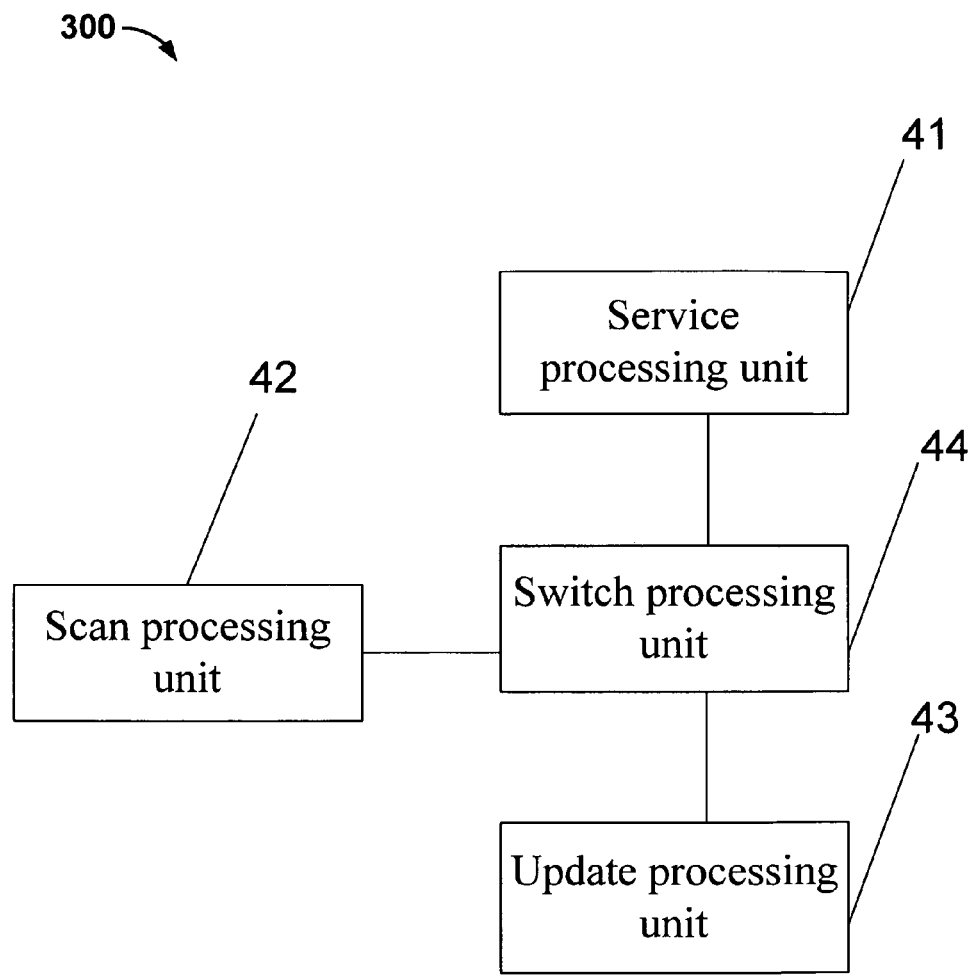
FIG. 3 is a diagram showing an embodiment of an internal structure of a service processing engine.

FIG. 3 is a diagram showing an embodiment of an internal structure of a service processing engine. In some embodiments, first service processing engine 32 and/or second service processing 33 may be implemented using structure 300. As shown in FIG. 3, units 41, 42, 43, and 44 may be connected through hardware such as bus or connection network, and/or based on software logic.

Structure 300 includes:

Service processing unit 41, which is connected with input data processing unit 31 and output data processing unit 34 as shown in FIG. 1. The service processing unit is configured to process the specific service logic, generate the service processing result in response to an input received from input data processing unit 31 and then send the result to the output data processing unit 34. In various embodiments, service processing unit 41 compares the data contained in the service processing request against a service rule stored in whichever one of first service rule storage unit 22 and/or second service rule storage unit 23 that corresponds to the service processing engine as represented by structure 300 for whether the data satisfies the service rule. For example, a service processing request contains data stored in three fields: Field A, Field B, and Field C. First service rule storage unit 22 and second service rule storage unit 23 stores conditions (e.g., service rules) that Field A, Field B, and/or Field C may satisfy. In this example, input processing unit 31 sends a service processing request (e.g., that input processing unit 31 has received) to service processing unit 41 of whichever one of the first service processing engine 32 and second service processing engine 33 that is currently in the operation status. In some embodiments, service processing unit 41 extracts the data contained in Field A, Field B, and/or Field C of the service processing request. Service processing unit 41 compares the data against the service rules stored in corresponding first service rule storage unit 22 and/or second service rule storage unit 23 and generates a determination result (e.g., indicating whether any of the service rules were satisfied) and then transmits it to output data processing unit 34.

Scan processing unit 42 is configured to detect whether one of the service rules and/or the processing setting of one of the processing engines has been changed. In particular, scan processing unit 42 detects whether the corresponding service rule storage unit and/or the processing setting of the corresponding engine has been changed. In some embodiments, scan processing unit 42 detects only a change to the corresponding service rules that are stored in the corresponding service rule storage. For example, if scan processing unit 42 were part of the internal structure of first service processing engine 32, then scan processing unit 42 could only detect any modifications to a service rule stored in first service rule storage unit 22 because the first service rule storage unit 22 corresponds to first service processing engine 32. Also for example, if scan processing unit 42 were part of the internal structure of second service processing engine 33, then scan processing unit 42 could only detect any modifications to a service rule stored in second service rule storage unit 23 because the second service rule storage unit 23 corresponds to second service processing engine 33. In some embodiments, scan processing unit 42 can also detect whether the contents stored in service rule library 21 and the setting of the currently operating processing engine (e.g., whichever of first or second service processing engine 32 or 33 is currently in the operation status and not the service processing engine in the wait status) have been changed. If a change has been detected, then scan processing unit 42 transmits an update trigger signal to switch processing unit 44, which in turn controls the transmission of the update trigger signal to update processing unit 43. Alternatively, upon detection of any change, scan processing unit 42 transmits the update trigger signal to the update processing unit 43, which in turn transmits the update trigger signal to switch out processing unit 44 after performing an update operation.

Update processing unit 43 is configured to update the rule stored in the first service rule storage unit 21/the second service rule storage unit 22 for consistency with the service rule library 21 and to update the processing engine that is currently in the operation status. An update operation of update processing unit 43 can include updating only the service rule stored in the corresponding service rule storage unit to be consistent with the service rule stored in service rule library 21. Update processing unit 43 can further perform an operation of restarting the corresponding processing engine (e.g., whichever of first or second service processing engine that update processing unit 43 is a part of) and put the modified processing engine into effect (e.g., into the operation status).

In some embodiments, triggering of update processing unit 43 can alternatively be initiated from scan processing unit 42. For example, update processing unit 43 can perform the update operation upon reception of the trigger signal transmitted from scan processing unit 42 and transmit an update completion signal to switch processing unit 44 after performing the update operation. In some embodiments, triggering of update processing unit 43 can be initiated from switch processing unit 44. For example, update processing unit 43 can perform the update operation upon reception of the trigger signal transmitted from switch processing unit 44 and transmit an update completion signal to switch processing unit 44 after performing the update operation.

In some embodiments, service processing unit 41 and scan processing unit 42 will not be operative at the same time. The scan processing unit 42 will be operative only when the corresponding processing engine is in the wait status and service processing unit 41 will wait to operate only when the corresponding processing engine is in the operation status. In some embodiments, switch processing unit 44 determines which of scan processing unit 42 and service processing unit 41 is operating (e.g., based on which of operation or wait status the service processing engine is currently in).

The following is one example of how scan processing unit 42, switch processing unit 44, and update processing unit 43 may communicate with one another:

1) When scan processing unit 42 is operating (e.g., when the service processing engine is in the wait status) the trigger signal can be transmitted to update processing unit 43 if it is detected that one of the service rules in service rule library 21 has been modified;

2) Update processing unit 43 updates the service rule in the corresponding service rule storage unit to be consistent with the modified service rule at service rule library 21 and transmits the update completion signal to switch processing unit 44; and 3) Upon reception of the update completion signal, switch processing unit 44 transmits a disabling instruction to the other service processing engine (e.g., which places the other service processing engine into the wait status) and then sets the present service processing engine into the operation status. The switch processing unit further transmits an operation disabling instruction to scan processing unit 42 and puts service processing unit 41 into operation (e.g., so that the present service processing engine may be set into the operation status).

Upon reception of a disabling instruction transmitted from the other service processing engine when the present service engine is in operation, switch processing unit 44 sets the present service processing engine into the wait status, transmits an operation stop signal to service processing unit 41 and puts scan processing unit 42 into operation. Moreover, update processing unit 43 may also perform the update operation.

The following is a second example of how scan processing unit 42, switch processing unit 44 and update processing unit 43 may communicate with one another:

1) When scan processing unit 42 is in the operation status, the trigger signal can be transmitted to switch processing unit 44 if it is detected that one of the rules in the service rule library 21 has been modified;

2) Upon reception of the trigger signal, switch processing unit 44 transmits the signal to update processing unit 43, which in turn performs the update operation and returns the update completion signal to switch processing unit 44;

3) Upon reception of the update completion signal, switch processing unit 44 transmits a disabling instruction to the other service processing engine, and then sets the present service processing engine into the operation status, transmits an operation stop signal to scan processing unit 42 and puts service processing unit 41 into operation.

Upon reception of a disabling instruction transmitted from the other service processing engine at the present service engine that is in the operation status, switch processing unit 44 sets the present service processing engine into the wait status, transmits an operation stop signal to service processing unit 41 and puts scan processing unit 42 into operation. Moreover, update processing unit 43 may also perform the update operation.

Figure 4:
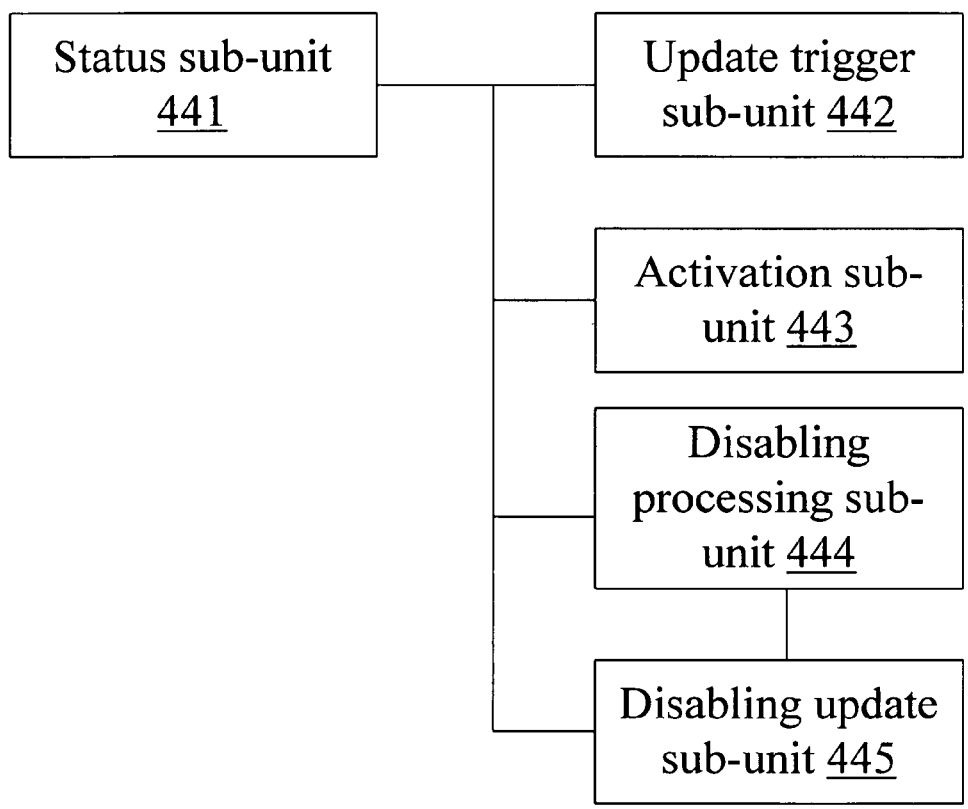
FIG. 4 is a diagram of an embodiment of a switch processing unit.

FIG. 4 is a diagram of an embodiment of a switch processing unit. In some embodiments, FIG. 4 is an example of switch processing unit 44.

Status sub-unit 441 is configured to store whether the corresponding service processing engine is currently in the operation status or the wait status.

Update trigger sub-unit 442 is configured to transmit the trigger signal to update processing unit 43 to activate the update operation of update processing unit 43 upon reception of a signal from scan processing unit 42, when the present service processing engine is in the wait status.

Activation sub-unit 443 is configured to transmit the disabling instruction to the other service processing engine and then set status sub-unit 441 of the present service processing engine in the operation status. Activation sub-unit 443 is also configured to transmit the operation stop signal to scan processing unit 42 upon reception of the update completion signal from update processing unit 43.

Disabling processing sub-unit 444 is configured to set the present service processing engine into the wait status, transmit the operation stop signal to service processing unit 41 and put scan processing unit 42 into operation upon reception of the disabling instruction transmitted from the other service processing engine.

Disabling update sub-unit 445 is connected with disabling processing sub-unit 444 and is configured to transmit to update processing unit 43 the trigger signal transmitted from disabling processing sub-unit 444 upon reception of the trigger signal.

In some embodiments, when scan processing unit 42 directly instructs the update processing unit 43 to perform the update operation, update trigger sub-unit 442 can be omitted.

Figure 5:
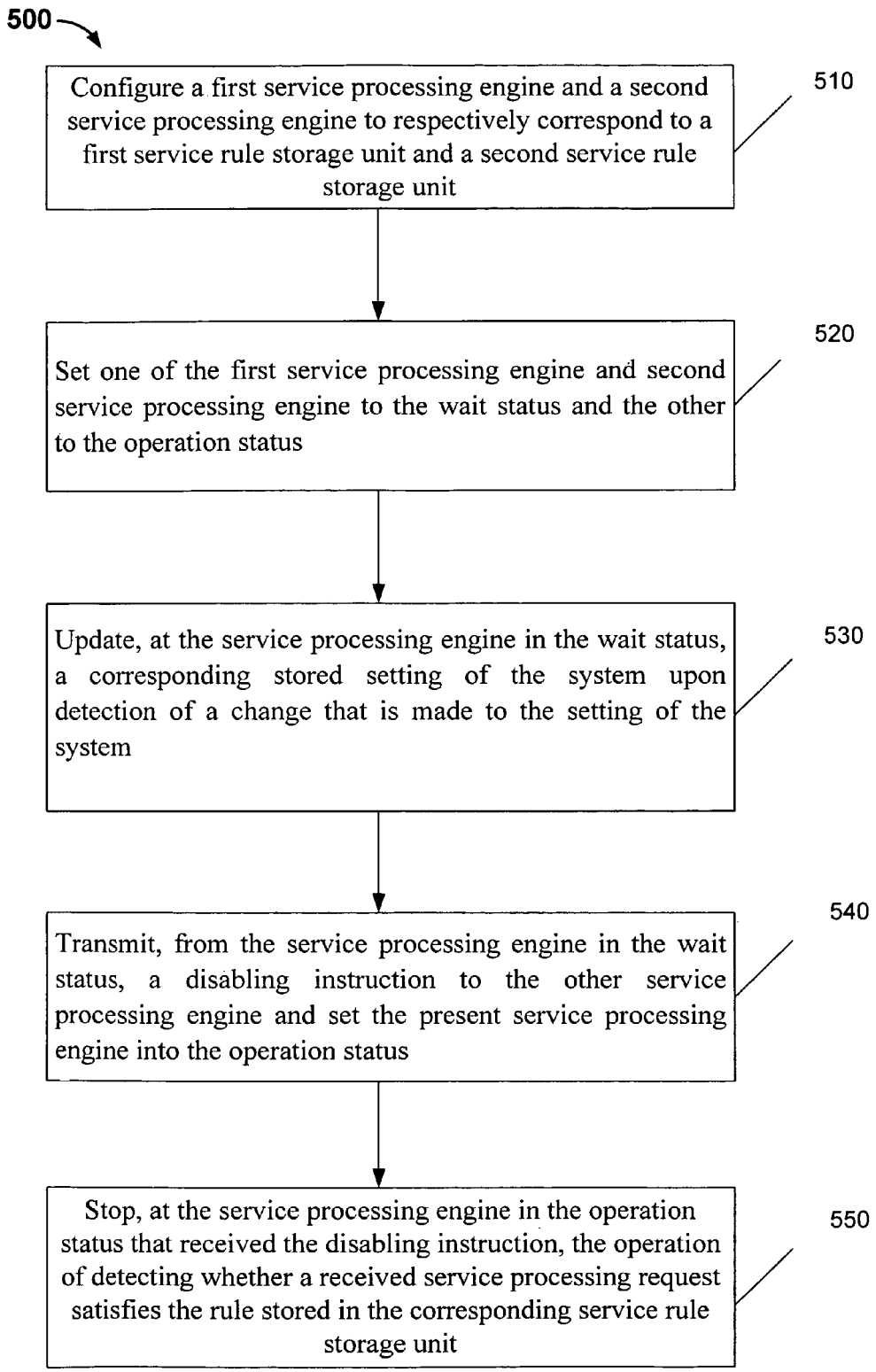
FIG. 5 is a flow diagram showing another embodiment of a process of hot deployment.

FIG. 5 is a flow diagram showing another embodiment of a process of hot deployment. Process 500 may be performed on a system such as system 100.

At 510: a first service processing engine and a second service processing engine are configured to respectively correspond to a first service rule storage unit and a second service rule storage unit.

At 520: one of the first service processing engine and the second service processing engine is set into the wait status and the other is set into the operation status. In other words, only one of first and second service processing engines is operating at a time, while the other engine is in the wait status. In some embodiments, the engine in the wait status will remain in the wait status until it receives a notification to enter into the operation status.

The service processing engine that is set into the operation status processes a specific service logic and generates a service processing result in response to an input. This step includes that the currently operating service processing engine detects whether a received service processing request satisfies the rule stored in the corresponding service rule storage unit and outputs a result (e.g., indicating whether the service rule was satisfied).

The other service processing engine that is set into the wait status detects (e.g., in real time or periodically) whether the service rule and/or the processing setting of the present processing engine has been changed (e.g., by a user).

Assuming that a service rule library has been configured, a change to the service rule refers to an inconsistency of the rule in the service rule storage unit with the version of the same rule that is stored in the service rule library.

Assuming that a service rule library has not be configured, further steps can be initiated once the rule in the service rule storage unit is changed, e.g., modified, deleted, etc.

At 530: the service processing engine that is set into the wait status updates a corresponding stored setting of the system upon detection of a change that is made to the setting of the system.

In some embodiments, the change to the setting of the software system includes a change to one of the service rules and/or a change to the processing setting of the waiting service processing engine.

At 540: the service processing engine that is set into the wait status transmits a disabling instruction to the other service processing engine and sets the present service processing engine into the operation status. Being in the operation status entails that a specific service logic is processed and a service processing result is generated in response to an input. This includes the operating service processing engine determining whether a received service processing request satisfies the rule stored in the corresponding service rule storage unit and outputting a result.

550: the other service processing engine (e.g., the service processing engine in the operation status that received the disabling instruction in S540) stops the operation of determining whether a received service processing request satisfies the rule stored in the corresponding service rule storage unit and then sets the present service processing engine into the wait status and further performs the update operation on the software system. The service processing engine which is set into the wait status may detect (e.g., in real time or periodically) whether the service rule and/or the processing setting of the present processing engine has been changed.

Figure 6:
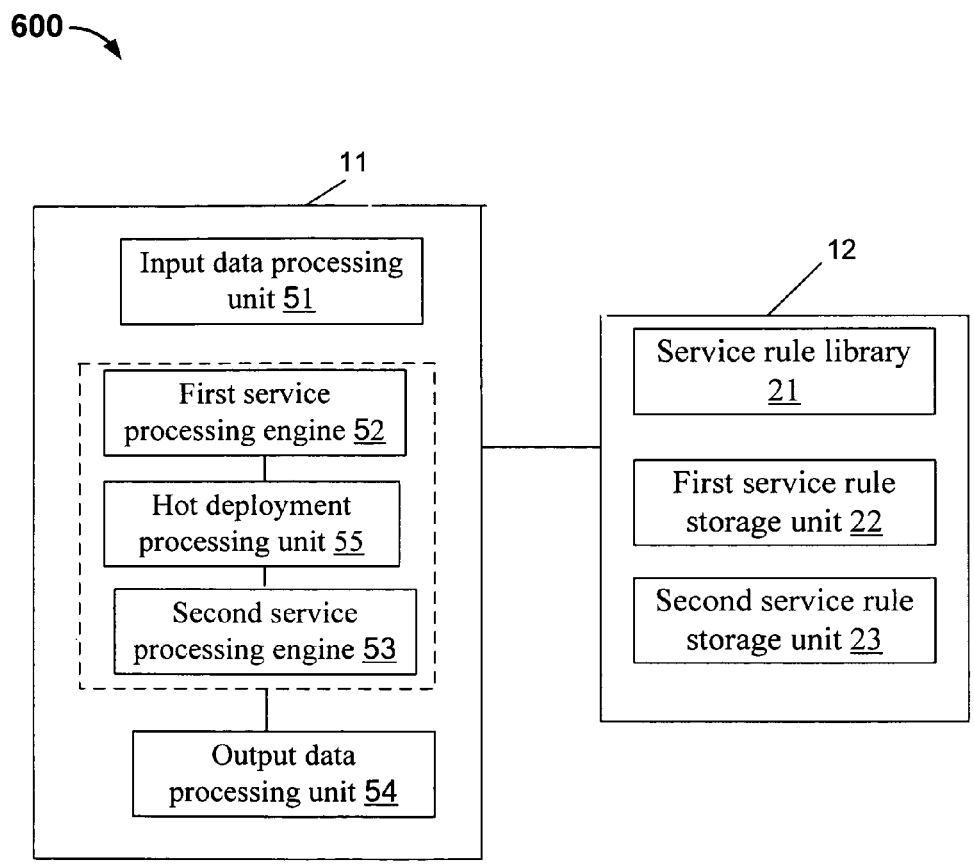
FIG. 6 is a diagram showing another embodiment of a system for hot deployment.

FIG. 6 is a diagram showing another embodiment of a system for hot deployment. At least one difference between system 100 and system 600 is that in system 600, hot deployment processing unit 55 controls which of the two service processing engines is currently in the operation status.

Similar to system 100, system 600 includes database 11 and server 12. Similar to system 100, server 11 further includes input data processing unit 51, first service processing engine 52, second service processing engine 53 and output data processing unit 54. Unlike system 100, server 11 in system 600 includes hot deployment processing unit 55. Hot deployment processing unit 55 is connected with both first service processing engine 52 and second service processing engine 53 and is configured to modify the status of first service processing engine 52 and second service processing engine 53 based at least in part on a disabling instruction transmitted by one service processing engine to the other. In the example shown in FIG. 6, hot deployment processing unit 55 controls which of first service processing engine 52 and second service processing engine 53 is in the operation status (and which is in the wait status).

In some embodiments, similar to system 100, first service processing engine 52 and second service processing engine 53 can each include a service processing unit, a switch processing unit, an update processing unit, and a scan processing unit. In some embodiments, first service processing engine 52 and second service processing engine 53 can include only a service processing unit, a scan processing unit, and an update processing unit; the function of a switch processing unit can be integrated in hot deployment processing unit 55.

In some embodiments, when first service processing engine 52 and second service processing engine 53 each includes a service processing unit, a switch processing unit, an update processing unit, and a scan processing unit similar to system 100, first service processing engine 52 and second service processing engine 53 can further include:

A service processing unit connected with input data processing unit 51 and output data processing unit 54. The service processing unit may be configured to determine whether a service processing request received from input data processing unit 51 satisfies a rule stored in the present service rule storage unit and also be configured to output a result to output data processing unit 54.

A scan processing unit that is configured to detect whether one of the service rules and/or the processing setting of one of the processing engines has been changed.

An update processing unit that is configured to update first service rule storage unit 22 and/or second service rule storage unit 23 to update the present processing engine when the scan processing unit detects a change to one of the service rules and/or the processing setting of one of the processing engines.

A switch processing unit that is configured to put service processing unit 61 (not shown) or service processing unit 62 (not shown) into operation upon reception of the instruction from hot deployment processing unit 55.

In some embodiments, first service processing engine 52 and second service processing engine 53 can each include only a service processing unit, a scan processing unit, and an update processing unit. Hot deployment processing unit 55 is connected with both of the service processing units, the scan processing units, and the update processing units of the respective processing engines. And as a consequence, hot deployment processing unit 55 controls the respective units to operate.

Figure 7:
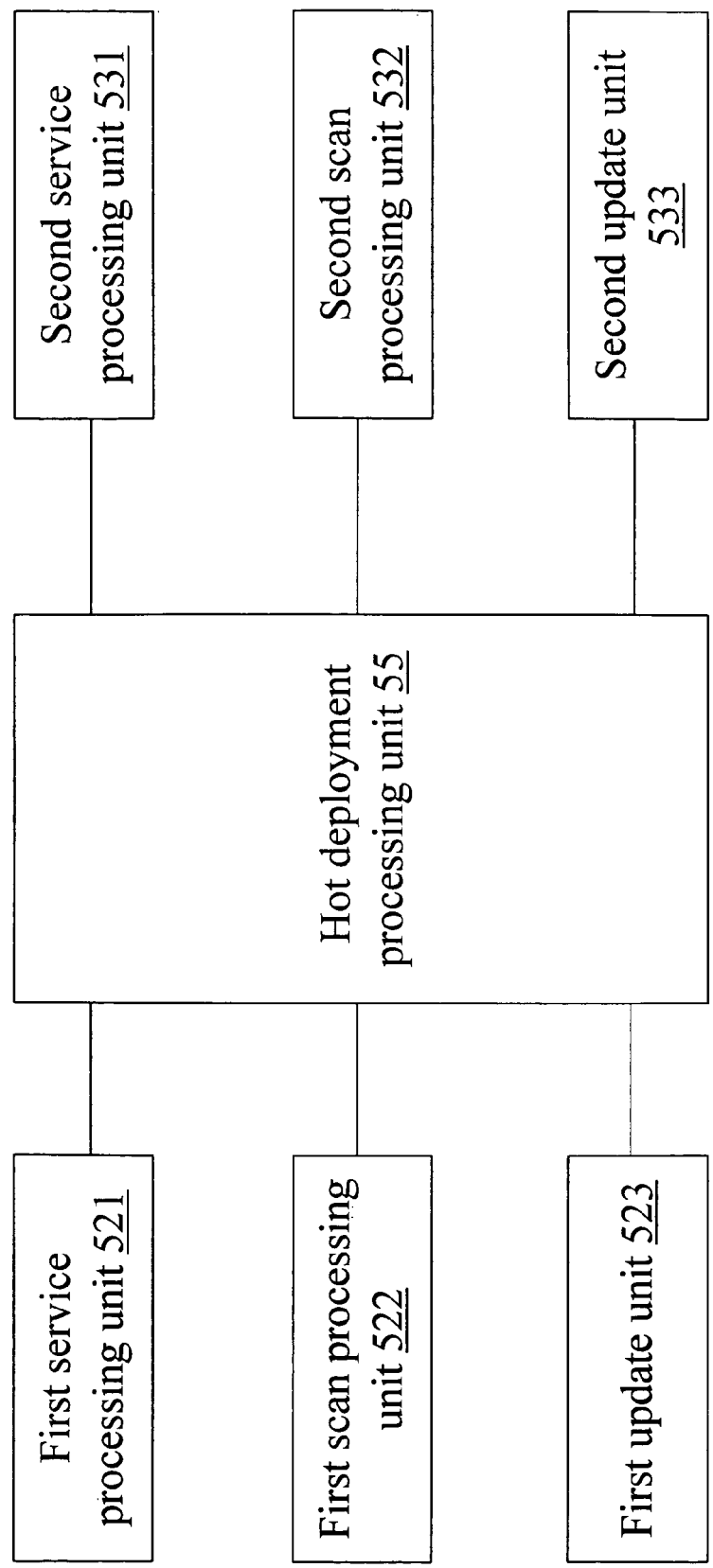
FIG. 7 is a diagram showing an embodiment of how a hot deployment processing unit may interact with a first and second service processing engine.

FIG. 7 is a diagram showing an embodiment of how a hot deployment processing unit may interact with a first and second service processing engine. As shown in the example, first service processing engine 52 includes first service processing unit 521, first scan processing unit 522 and first update unit 523 and second service processing engine 53 includes second service processing unit 531, second scan processing unit 532 and second update unit 533. Also in this example, first service processing engine 52 is in the operation status and second service processing engine 53 is in the wait status. Hot deployment processing unit 55 instructs second update unit 533 to perform an update operation upon reception of a trigger signal from second scan processing unit 531. Hot deployment processing unit 55 transmits an operation stop signal to first service processing unit 521 and second scan processing unit and puts first scan processing unit 522 and first service processing unit into operation status upon reception of an update completion signal from second update unit 533.

In some embodiments, hot deployment processing unit of the hot deployment system can perform hot deployment on the first service processing engine and the second service processing engine in the following steps:

1) The hot deployment processing unit is configured;

2) The first service processing engine and/or the second service processing engine directly updates the service rule storage unit corresponding to the presently operating processing engine and transmits a request to the hot deployment processing unit upon detection of a change to the service rule or the processing setting of the processing engine. In some embodiments, the request indicates that a change has been detected and/or which service rule or processing setting has been changed.

3) In some embodiments, if the service processing engine that transmitted the request is currently in the operation status, then that service processing engine would need to be set into the wait status so that its corresponding setting may be updated. Also, the other service processing engine that was previously in the wait status would need to be set into the operation status. In some embodiments, if the service processing engine that transmitted the request is currently in the wait status, then that service processing engine can be updated first and then the other service processing engine currently in the operation status may be switched to the wait status so that it can be updated also. For example, the hot deployment processing unit updates one of the first service processing engine or the second service processing engine, from whichever the request was transmitted, and then sets it into the operation status and also sets the other service processing engine into the wait status by transmitting a disabling instruction to that service processing engine. Upon reception of the disabling instruction, the other service processing engine sets the present service processing engine into the wait status and then updates the rule in its service rule storage unit or a software setting of the corresponding service processing engine.

An Example of an Application Scenario

The following example relates to a system of hot deployment for credit authentication over a network. The input data processing unit receives a credit authentication request. One of the first service processing engine and the second service processing engine, whichever is in the operation status, performs authentication in response to the received credit authentication request. When one of the rules in the service rule library (e.g., an individual credit rule) is changed, the rules of the respective service processing engines can eventually be updated without both of the service processing engines being stopped from operation (e.g., an disruption of the entire application running on the system). The foregoing disclosure is merely illustrative of several embodiments of the invention, but the invention will not be limited thereto, and any variation which can occur to those skilled in the art shall come into the claimed scope of the invention.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of software deployment, comprising:

configuring a first service processing engine and a second service processing engine, wherein each of the first and the second service processing engine is configured to perform a service;

setting the first service processing engine into an operation status and the second service processing engine into a wait status, wherein the first service processing engine being in the operation status is configured to receive a service request and determine whether at least a portion of the service request satisfies a service rule from a stored plurality of service rules and wherein the second service processing engine being in the wait status is configured to not receive the service request and to scan for a change that is to affect the performance of the service;

detecting the change that is to affect the performance of the service using the second service processing engine being in the wait status, wherein the change includes a modification to the stored plurality of service rules;

updating the second service processing engine in the wait status based at least in part on the detected change; and setting the updated second service processing engine into the operation status and the first service processing engine into the wait status.

2. The method of claim 1 further comprising:

updating the first service processing engine in the wait status based at least in part on the detected change.

3. The method of claim 1, wherein setting the updated second service processing engine into the operation status includes sending a disabling instruction to the first service processing engine.

4. The method of claim 1, wherein the first service processing engine is configured to correspond to a first service rule storage and the second service processing engine is configured to correspond to a second service rule storage.

5. The method of claim 1, wherein the wait status comprises either updating a processing setting or service rule or detecting a subsequent change that is to affect performance of the service.

6. The method of claim 1, wherein the change comprises an addition of or a modification of a service rule and/or a modification to a processing setting associated with the second service processing engine.

7. The method of claim 1, wherein detecting is performed periodically or in real-time.

8. The method of claim 6, wherein updating comprises modifying a corresponding service rule or a corresponding processing setting associated with the second service processing engine to correspond to the addition of or the modification of the service rule and/or the modification to the processing setting of the second service processing engine.

9. A system for software deployment, comprising:

one or more processors configured to:

execute a first service processing engine and a second service processing engine, wherein each of the first and the second service processing engine is configured to perform a service;

set the first service processing engine into an operation status and the second service processing engine into a wait status, wherein the first service processing engine being in the operation status is configured to receive a service request and determine whether at least a portion of the service request satisfies a service rule from a stored plurality of service rules and wherein the second service processing engine being in the wait status is configured to not receive the service request and to scan for a change that is to affect the performance of the service;

detect the change that is to affect the performance of the service using the second service processing engine being in the wait status, wherein the change includes a modification to the stored plurality of service rules;

update the second service processing engine in the wait status based at least in part on the detected change; and set the updated second service processing engine into the operation status and the first service processing engine into the wait status; and a memory coupled to the processor and configured to provide the processor with instructions.

10. The system of claim 9, the one or more processors further configured to:

update the first service processing engine in the wait status based at least in part on the detected change.

11. The system of claim 9, wherein to set the updated second service processing engine into the operation status includes to send a disabling instruction to the first service processing engine.

12. The system of claim 9, wherein the first service processing engine is configured to correspond to a first service rule storage and the second service processing engine is configured to correspond to a second service rule storage.

13. The system of claim 9, wherein the wait status comprises the one or more processors configured to either update a processing setting or service rule or detect a subsequent change that is to affect performance of the service.

14. The system of claim 9, wherein the change comprises an addition of or a modification of a service rule and/or a modification to a processing setting associated with the second service processing engine.

15. The system of claim 9, wherein the one or more processors are configured to detect the change periodically or in real-time.

16. The system of claim 14, wherein to update comprises to modify a corresponding service rule or a corresponding processing setting associated with the second service processing engine to correspond to the addition of or the modification of the service rule and/or the modification to the processing setting of the second service processing engine.

17. A computer program product for software deployment, the computer program product being embodied in a non-transitory computer readable storage medium and comprising computer instructions for:

executing a first service processing engine and a second service processing engine, wherein each of the first and the second service processing engine is configured to perform a service;

setting the first service processing engine into an operation status and the second service processing engine into a wait status, wherein the first service processing engine being in the operation status is configured to receive a service request and determine whether at least a portion of the service request satisfies a service rule from a stored plurality of service rules and wherein the second service processing engine being in the wait status is configured to not receive the service request and to scan for a change that is to affect the performance of the service;

detecting the change that is to affect the performance of the service using the second service processing engine being in the wait status, wherein the change includes a modification to the stored plurality of service rules;

updating the second service processing engine in the wait status based at least in part on the detected change; and setting the updated second service processing engine into the operation status and the first service processing engine into the wait status.

* * * * *